United States Patent [19]
Jahn

[11] 3,905,352
[45] Sept. 16, 1975

[54] SYSTEM FOR COLLECTING AND TRANSFERRING USABLE SOLAR HEAT

[76] Inventor: Arnold Jahn, 1124 N. Elm St., Fairmont, Minn. 56031

[22] Filed: Aug. 31, 1973

[21] Appl. No.: 393,561

[52] U.S. Cl. .................. 126/270; 60/641; 126/400; 165/104 M
[51] Int. Cl.² ........................................... F24J 3/02
[58] Field of Search .......... 126/270, 271, 375, 400; 350/299; 250/215; 60/26; 165/104 M

[56] References Cited
UNITED STATES PATENTS

| | | | |
|---|---|---|---|
| 260,657 | 7/1882 | Calver | 126/270 |
| 514,669 | 2/1894 | Allingham | 126/270 |
| 561,755 | 6/1896 | Barr | 126/270 |
| 603,317 | 5/1898 | Calver | 126/270 |
| 608,755 | 8/1898 | Cottle | 126/270 X |
| 784,005 | 2/1905 | Ketchism | 126/271 |
| 1,386,781 | 8/1921 | Harvey et al. | 126/271 |
| 1,658,455 | 2/1928 | Metzech | 126/271 |
| 1,951,404 | 3/1934 | Goddard | 126/270 |
| 2,182,222 | 12/1939 | Courtis et al. | 126/270 |
| 2,933,885 | 4/1960 | Benedek et al. | 60/26 |
| 2,967,249 | 1/1961 | Quirk | 250/215 |
| 3,466,119 | 9/1969 | Francia | 126/270 X |
| 3,469,837 | 9/1969 | Heilig | 350/299 UX |

FOREIGN PATENTS OR APPLICATIONS

| | | | |
|---|---|---|---|
| 1,049,534 | 11/1966 | United Kingdom | 126/400 |
| 569,390 | 5/1945 | United Kingdom | 165/104 M |

Primary Examiner—William F. O'Dea
Assistant Examiner—Peter D. Ferguson
Attorney, Agent, or Firm—Williamson, Bains & Moore

[57] ABSTRACT

A system and apparatus for collecting, concentrating, transferring and storing for use solar radiant heat energy is disclosed in this application. The system employs "sun-tracking" mirror apparatus moved through a predetermined orbit and comprising preferably a plurality of circumferentially spaced mirror units. Each mirror unit comprises preferably a multiplicity of individually adjustable mirrors arranged in banks which reflect in orbit solar rays advantageously to a concentrated heat-absorbing area of a novel vaporizer or boiler utilizing preferably mercury and mercury vapor as heat-absorbing, conducting and transferring medium. The multibank flat reflector units are mounted on a turntable or track to revolve in timed sequence with the sun travel and the novel vaporizer or boiler is axially mounted of the revolving apparatus and preferably is stationary with an insulating shutter arrangement revolving in orbit with the mirror reflector units and exposing through control, the concentrated heat-absorption area at the upper portion of the vaporizer. In orbit, tilting of the individual flat mirror reflectors of the multi-bank units is controlled in highly efficient manner by mechanical and/or electro-mechanical media responsive in the orbiting of the said banks of mirrors by now available and successive sun sensors. Preferably applicant employs one commercial sun sensor which is used to orient a 360° table to the sun in azimuth and a second sun sensor which is used to orient an elevation mechanism from −10° to +40° or more in elevation. The commercially available sensors include the necessary controls and drive mechanisms for individually adjusting the flat mirrors in orbit to effectively reflect sun rays to the critical vaporizer area. Preferably the invention also includes in combination with the aforesaid apparatus and system, a new storage cell medium employing variable admixtures of comminuted copper metal and particles of salt whereby the rate of transmission of heat energy inwardly to the core thereof, as well as outward and external flow of heat from the storage medium, may be controlled.

11 Claims, 17 Drawing Figures

FIXED REFLECTOR

FIG. 12

SYSTEM FOR COLLECTING AND TRANSFERRING USABLE SOLAR HEAT

BACKGROUND OF THE INVENTION

Several vaporizers or boilers are disclosed in the prior art which are actuated by reflection of the sun's rays from mirrors, including parabolic reflectors focused in a desired area of the boiler structure or vaporizer. The prior art further shows a variety of boilers and vaporizers where liquid mercury is employed as a source for absorption and transfer of solar heat to storage or auxiliary boiler systems which in turn may operate through high pressure steam, a turbine or the like to drive an electrical generator or furnish mechanical power. A stationary so-called solar furnace has been employed, utilizing a multiplicity of glass mirrors which the sun's rays strike during only an advantageous portion of the day.

The individual mirrors arranged in multiple-bank formation are predeterminately and fixedly adjusted to reflect only during a short period of the sun's trajectory concentrated solar rays into a predeterminately and fixedly mounted parabolic mirror. This parabolic mirror during the effective time interval concentrates reflective heat rays upon a relatively small "hot spot" of an oven.

Further prior art known to applicant consists in mounting a single parabolic reflector for revolution with the trajectory of the sun and during revolution of said parabolic reflector solar rays when trapped advantageously therein are reflected to a central vaporizer of spherical shape. No means in such system is employed for sensing the sun in azimuth or orienting an elevation mechanism for any adjustment of either the reflector or the position of the vaporizer.

To my knowledge the prior art has never disclosed or suggested an orbiting, constantly adjusted reflective unit (or plurality of units) which employs for each unit a multiplicity of reflectors mounted in bank formation and wherein the individual reflectors of the unit or units are constantly adjusted effectively throughout the sun's trajectory to reflect and concentrate sun rays in orbit upon an axially disposed heat receptive area; and wherein sun sensors and controls now available to the public are combined to correctly sense and orient a 360° table to the sun in azimuth and an elevation mechanism effective through a predetermined angle elevation.

SYNOPSIS OF THE INVENTION

Generally stated, my invention employs a planetary or orbital system wherein a novel, unitary mercury boiler or vaporizer is axially disposed of one or more orbitally moving solar ray reflecting and concentrating units mounted upon a turntable, track or the like. Each of said reflector units comprises a multiplicity of individual reflective mirror structures mounted for individual adjustment in a common frame and arranged in banks which, through constant control in a sun-tracking relation throughout orbital travel, effectively concentrate and reflect sun rays during a variable trajectory of the sun open and against an effective heat-receiving area of the unitary and axially mounted boiler or vaporizer.

The said novel mercury vaporizer is preferably mounted on a fixed location axially of the orbital travel of the reflective unit or units and preferably is provided with a revolving heat-insulated shutter mechanism which travels with the platform or support for the unit or units and exposes at any time only a fraction (approximately 40%) of the sensitized surface heat-receiving area at the top portion of the boiler.

The individual reflectors of each unit are preferably of flat surface type, each being mounted on a ball and socket joint or otherwise to permit and adapt itself to adjustment or tilting on a plurality of axes. Each of the multiple reflector units is supported in an upstanding rectangular frame which itself is mounted for swinging or tilting to an elevation mechanism from approximately −10° to +40° in elevation.

The tilting of said rectangular upstanding unit frame or frames where two or more units are employed in orbit is controlled by a now-available sun sensor and its control and driving mechanism which will orient the elevation mechanism for the rectangular frame within the range of minus and plus degrees to vertical recited.

The same sun sensor used to orient said elevating mechanism may well serve to individually adjust at slightly varying angles the multiplicity of reflectors in each unit tilting the same substantially as required to keep each mirror focused.

A second sun sensor and sensing control and driving system is employed for controlling the orbital travel of the rotary platform or track-mounted annulus analogous structure for supporting one or more of the orbital reflecting units.

Suitable commercially manufactured sensor, control system and drives are now available on the American market as for example the sensors, control systems and drives manufactured and sold by Adcole Corporation of Waltham, Massachusetts 02154, including for special use in applicant's herein-filed application a commercial model called Zea Model 11866 Sensors. In this model system, the analog output of the system is zero when pointing directly at the sun, is positive on one side of the sun, and negative on the other side of the sun. The motor drive controller will drive the system in the appropriate direction until the sensor output is zero. My invention, as hereafter disclosed in detail, provides in addition to the system and systems generally described in the foregoing synopsis a full system and plant for generating at high efficiency electricity for municipal and industrial uses. The invention preferably includes a storage medium for heat which comprises a mixture of comminuted salt and comminuted copper to constitute a storage cell. Through the variable admixture of these ingredients the rate of conductivity and transfer of heat from exteriorly of the cell and to the core and oppositely from the cell outwardly to a boiler or other medium supplied can be quite accurately controlled.

The collecting and concentrating mirrors working on a circular track with 360° traverse with the sensors will keep the multiplicity of mirrors throughout the seasons of the year in highly efficient focus with the sun and with concentration of rays on the heat-absorption portion of this stationary axially disposed boiler or vaporizer.

In working out careful calculations of results obtainable I contemplate production by two units of multiple mirror elements the production of heat to 1800°F. temperature on the absorbant vital portion at the top of the special boiler. Mercury vapor will leave the unit at nearly 1500°F. and arrive at the power plant or storage unit near 1400°F.

In use for municipal or large industrial purposes I contemplate placing of a large number of said stations or systems per acre of land available. This would comprise for a fairly good sized municipality the use of perhaps fifty stations per acre. The heating of three square feet to 1800°F. at each evaporator head would produce for fifty stations, one hundred fifty square feet at substantially 1400°F. surface. This area should produce at least three hundred pounds of steam per hour at 750° F. and four hundred pounds pressure. This amount of steam is known to be productive of three hundred kw per acre. A hundred acres would produce at least three hundred thousand pounds of steam or about thirty thousand kw of electricity.

DESCRIPTION OF AN EMBODIMENT

The structure, functions and advantages of an embodiment of my invention will be apparent from the following description made in connection with the accompanying drawings wherein like reference characters refer to similar parts throughout the several views and in which.

MULTI-MIRROR UNITS AND ROTARY SUPPORT THEREFOR

In my apparatus, I provide a plurality of multi-reflector units, indicated as entireties by the letter U, relatively positioned and supported from revoluble supporting means to very efficiently track and reflect solar rays cumulatively against a receptive small area boiler or vaporizer disposed axially thereof. While I prefer in each multi-reflector unit to employ substantially more individual flat reflectors R than are shown, for the sake of simplicity I have shown in the embodiment of FIGS. 1 and 2 for each unit U, a total of nine flat reflectors R disposed in vertical and horizontal banks, and individually controlled to in effect give the most efficient reflections in all positions of the sun during its travel between sunrise and sundown against the effective receptive surface of the boiler.

Figure 1:
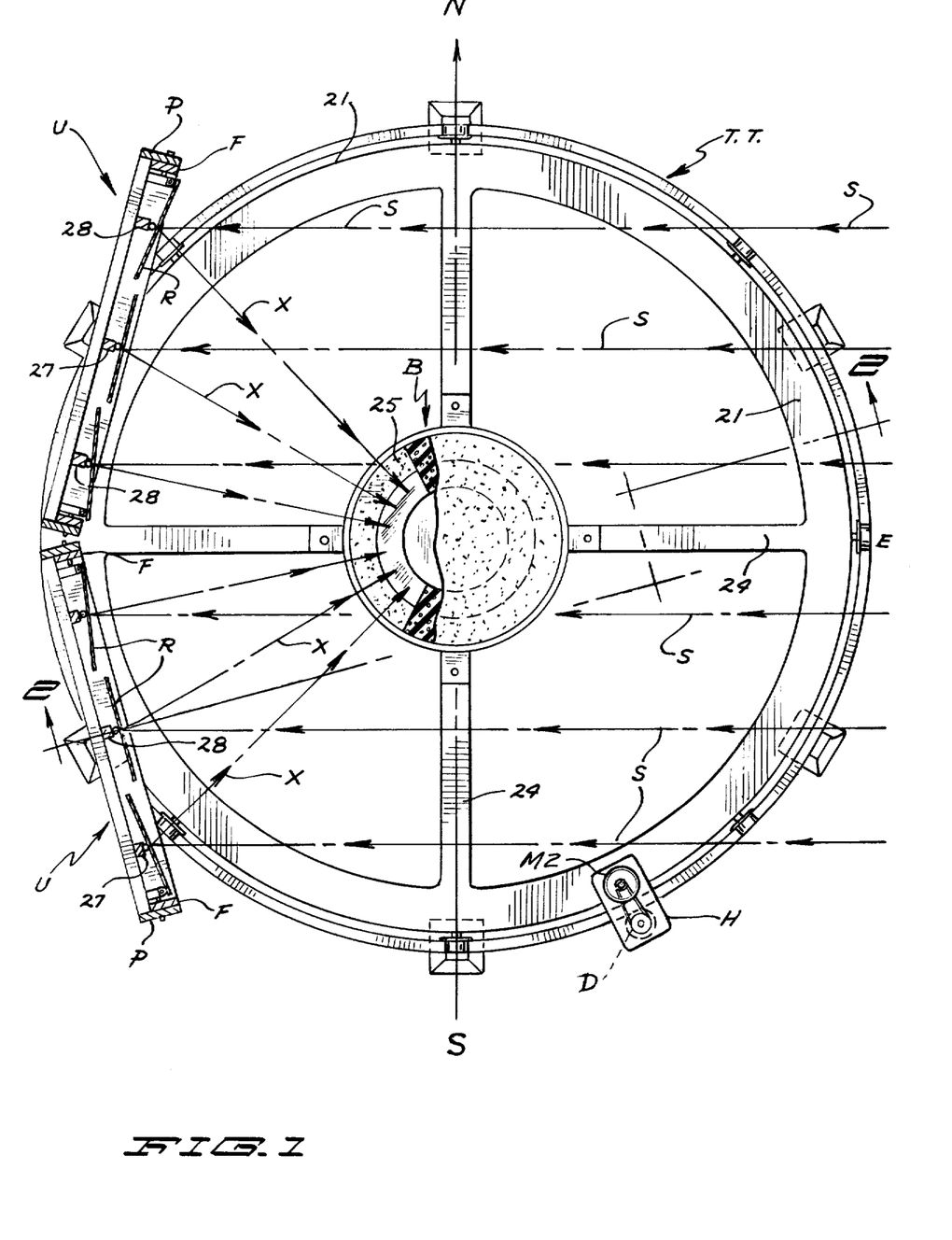
FIG. 1 is a top plan view of the principal apparatus (not including solar sensors or control and driving means and apparatus) for a somewhat simplified embodiment of my invention.
Figure 2:
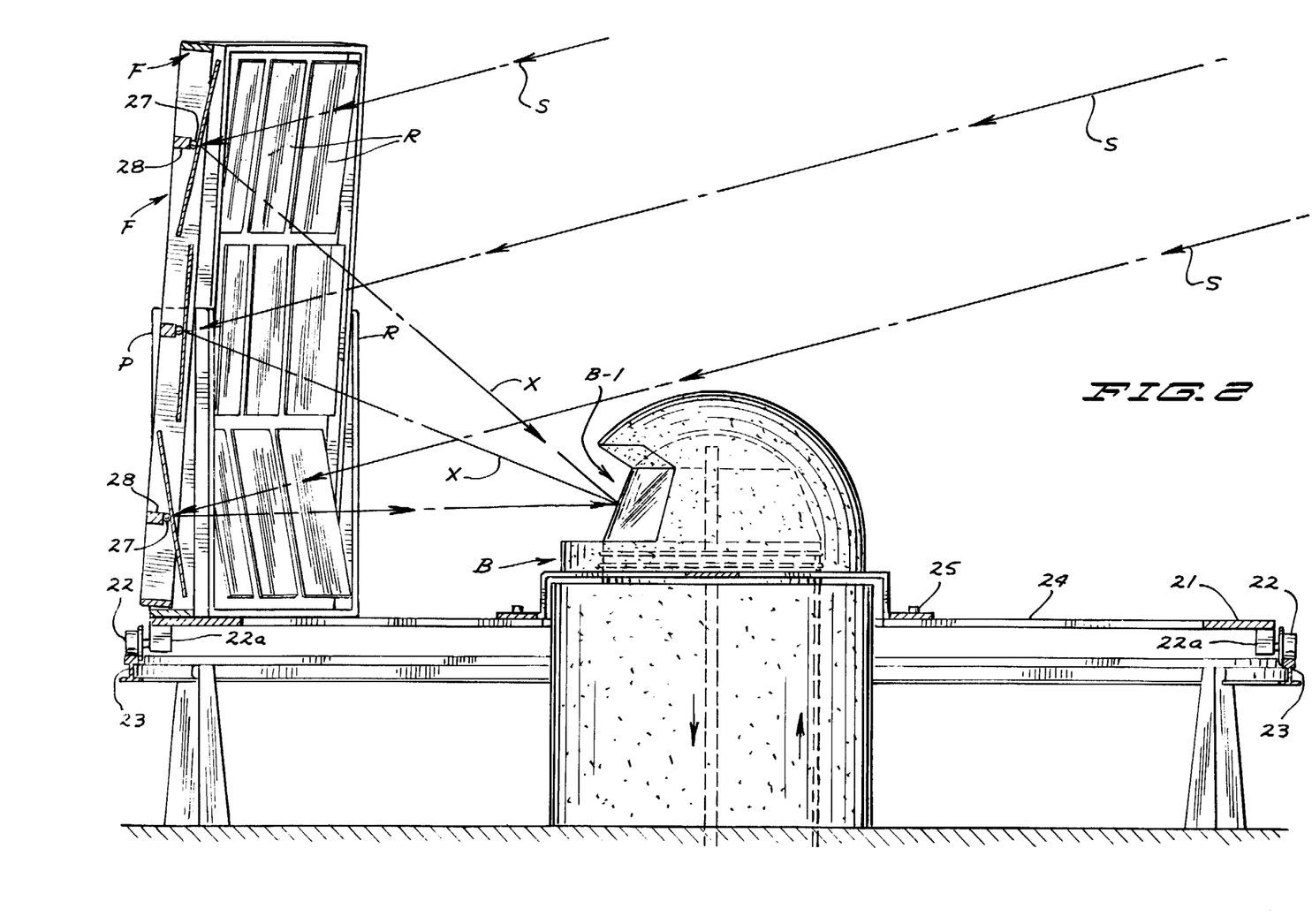
FIG. 2 is a vertical section taken on the jagged section line 2—2 of FIG. 1, showing the vaporizer or boiler and one of the multi-mirror units in elevation.

The nine reflectors, as shown in FIGS. 1 and 2, are mounted in tiltable, large, rectangular frames F which are supported for tilting by heavy trunnions 20 on horizontal, transverse axes (see FIGS. 3 and 4) journalled and supported from rigid, upstanding posts P having the bases thereof rigidly secured to a turntable or support surface TT mounted for revolution in clockwise and counter-clockwise direction.

The revolving support for posts P and consequently the multimirror units U, as shown, is in the form of a turntable designated as an entirety by TT, which as shown includes a circumferential annulus 21 having at radially disposed intervals thereof bolsters 22a from which are rotatively mounted flanged supporting wheels 22. Wheels 22 rest upon and engage a circular track 23 which as shown, is of T-rail construction. To minimize weight of the turntable TT, spoke-like beams 24 radially emanate from an axial and center hub structure or ring 25 and are rigidly connected between said hub structure and the circumferential annulus 21. As will later be explained, the turntable TT is motor-driven either in clockwise or counterclockwise direction, or in some forms may be revolved only in a clockwise direction.

Referring again to the multi-reflector units U, each of the flat mirrors R is centrally supported and mounted for adjustment on a ball and socket joint 27 disposed at the very center of each mirror and which joint is supported as shown by a vertical rigid bar 28 having its upper and lower extremities rigidly affixed to the top and bottom bars of the respective unit-rectangular frame F. For each of the two units U shown in the drawings, nine square reflectors R are employed, arranged in very close juxtaposition in horizontal and vertical banks.

To facilitate understanding of the automatic adjustment mechanism for the multiplicity of individual mirrors in each unit U which immediately follows, there is the desirability to now recite a part of the operation of the embodiment described, particularly referring to FIGS. 1 through 6 of the drawings. In FIG. 1 the turntable TT and the two multiple mirror units U are shown in approximately the start of the sun tracking position where the location of the apparatus is at a geographical point in the United States between the latitudes 22 and 45 during the late spring and early summer seasons. The solar rays shown in broken lines and arrows indicated by the letter S, are emanating from the east at sharply acute angles to the horizontal. At such time through the sun tracking mechanism and control mechanism later to be described the large rectangular frames of the two units of said embodiment are slightly tilted (from vertical positions) and incline toward the axes of turntable TT. The nine individual flat mirrors R of each unit are respectively adjusted for most efficient reception and reflection of the solar rays indicated along broken lines with arrows thereon, as X. In such adjusted positions it will be seen that most of the nine individual reflectors of each unit have experienced both horizontal axis tilting and vertical axis tilting from planar positions which are parallel with the perimeter of the large rectangular mounting frames.

I have discovered that the sequential compound tilting of all of the numerous mirrors of each reflective unit U may be mechanically and efficiently controlled by the "elevational" tilting of the respective rectangular mounting frames F of the two or more units, to most effectively reflect solar rays upon the exposed receptive area of the centrally disposed boiler or vaporizer B. First, I would explain that the medial horizontal bank of planar mirrors R do not require change or adjustment in the tracking of the sun, either in respect to altitude changes of the sun's trajectory or in the horizontal relative movement of the sun to the location of my apparatus. Thus, as shown in FIGS. 2, 3, 4 and 6, the central mirror of the medial horizontal bank is fixed and remains in relation to its supporting large rectangular frame F in a planar parallel relation relative to said frame. The mirrors R at left and right of said centermost mirror R are fixed but are angled with respect to the centermost mirror (see FIGS. 4 and 5). Such angulations are opposite on the said left and right mirrors on predetermined acute angles and the tilting is along only the center up and down mid lines (see FIG. 5). Thus all variance of the precalibrated and determined positions of the three mirrors of the central bank during tracking of the sun (both as to elevation and horizontal trajectory), is directly controlled by tilting of the large mounting frames F of the two units.

Figure 6:
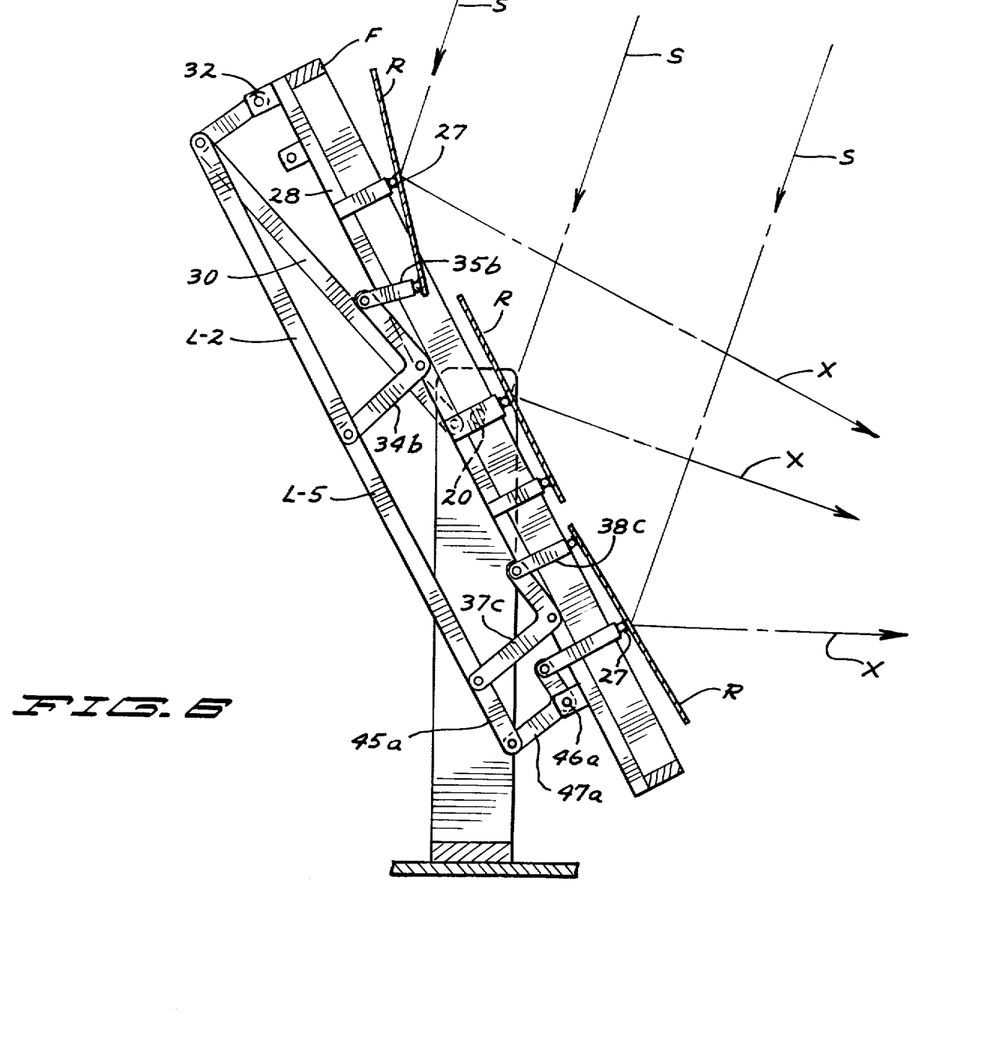
FIG. 6 is a vertical section similar to that of FIG. 4 but showing an elevational adjustment of the mirror unit and mounting frame and the positioning of the individual mirrors when the sun in altitude is positioned visually near the horizon.

The numerous mirrors R other than those of the horizontal middle bank previously referred to will be variably angulated and tilted relative to the general plane defined by the forward periphery of the rectangular unit frame F, during the orbit of the reflector units in clockwise directional travel of the turntable TT. Some of such individual reflectors in the sequential adjustments tilt only on one axis while the four reflectors disposed at the corners within the rectangular mounting frame tilt on two axes which intersect the respective ball and socket joints for supporting the reflectors. The said tilting-axes extending elevationally of the reflectors for simplicity will be referred to as "vertical axes", while the transverse tilting axes will be referred to as "horizontal axes". All sequential compound and single axis tilting are mechanically effected by bellcrank lever action or the equivalent coupled with fixed point fulcrum pins in a system wherein relative actuating movement is obtained through the elevational tilting of the rectangular mounting frame upon its rigid vertical supporting posts P which will now be described in some detail. First, by reference to the vertical cross sections of one of the reflector units shown in FIGS. 4 and 6, approximately the extreme tilting of the rectangular frame F is shown from the start (of approximate finish) of sun tracking operation (FIG. 4) to the top or zenith position of the sun (FIG. 6). The maximum inward tilting of the frame F in vertical shown in FIG. 4, approximates from 8° to 10° from the vertical while the approximate outward tilting of frame F with the sun at its highest altitude approximates between 30° and 50° from vertical. The compass directions north, east, etc., are indicated on FIG. 1 by the appropriate letters N, E, S, and W.

The controlled tilting of the large rectangular frames F is effected by suit able drive mechanism, later to be described, controlled by a solar sensor or a suntracking medium which responds primarily to the variance in sun elevation during the clockwise travel of turntable TT between sunrise and sunset.

Variable mirror-tilting-actuating mechanism, indicated as an entirety by the letter A, is interconnected with the rear of the large rectangular mounting frame F and includes an elongate actuating link 30 (at the left of the frame in FIG. 4) pivotally connected at its lower point by a pivot pin 30a to one of the rigid upstanding posts P at a point disposed rearwardly and eccentric to the respective trunnion 20 on which frame F is pivotally connected with a post P for tilting on a horizontal axis. The upper end of actuating link 30 is pivotally connected by pin 30b with an upper rocker arm 31 affixed to a horizontal rock shaft 32 which is mounted in suitable bearings provided by blocks 32a affixed in spaced relation to the several vertical socket support bars 28 (previously described). Rock shaft 32 extends transversely across the entire width of the rectangular mirror frame F at the top thereof and in its oscillating movement affected by the actuating link 30 one frame F is tilted on a horizontal axis and controls and actuates a series of (as shown) three vertical links L-1, L-2 and L-3 (see FIG. 4) by rocker arm connections with the upper ends thereof. The respective rocker arms are indicated by the numerals 33a, 33b and 33c. Links L-1, L-2 and L-3 at their lower ends are respectively pivotally connected with the outer ends of bell crank levers 34a, 34b and 34c (see FIGS. 3, 4 and 6). The fulcrum pins for said last-mentioned three bell crank levers are respectively secured from left to right on FIG. 3 with the appropriate three of the vertical support bars 28. The working or upper ends of the said bell crank levers are pivotally connected with short forwardly protruding bars 35a, 35b and 35c, respectively, see FIGS. 3, 4 and 6, which at their outer ends carry ball and socket joints connected at lower vertical center line points with the reflectors R of the upper horizontal bank, and said points are near the lower edges of said mirrors for tilting the same on horizontal axes.

For tiltably adjusting the lower horizontal bank of mirrors on horizontal axes but in opposite swinging direction from the tilting of the upper horizontal bank, I provide link and lever mechanism comprising three upstanding elongate links L-4, L-5 and L-6 having their upper ends pivotally connected, respectively, by pins 36a, 36b and 36c with both the lower ends of links L-1, L-2 and L-3, respectively, and also with the rearwardly projecting lower ends of the bell cranks 34a, 34b and 34c. Links L-4, L-5 and L-6 at their lower ends are pivotally connected with the lower rearwardly protruding ends of bell crank levers 37a, 37b and 37c and said last-mentioned bell cranks are pivotally connected at their fulcrum points with the same upstanding rigid support bars 28 to which the upper series of bell cranks 34a, 34b and 34c are connected. The working and upper ends of the bell cranks 37a, 37b and 37c are pivotally connected to short bars 38a, 38b and 38c, respectively, which at their forward ends have ball and socket connection with the upper edge portions of the lower horizontal bank of mirrors, said connections being disposed upon the upstanding center line of said lower horizontal bank of mirrors. The foregoing linkage and bell crank mechanism during the variable tilting of the large mirror mounting frame F sequentially actuates all tilting adjustment of the three banks of mirrors on their horizontal axis as is required for successful operation of my apparatus and system. It should be noted that all of the individual mirrors of the upper and lower banks in the embodiment illustrated receive variable tilting movements on horizontal axes. The upper and lower mirrors of the vertical middle bank receive, in operation, only tilting on their horizontal axes. The central horizontal bank of mirrors, as previously recited, receive no adjustment but are stationary in their originally positioned relation, the centermost being parallel with the plane defined by the front of frame F. To fix this centermost mirror in said position, means is provided, such as a fixed post 39, secured to the central vertical support bar 28 and having a fixed connection with said centermost mirror. The two mirrors at left and right of said centermost mirror are predeterminably, by calibration, angled oppositely toward the centermost and fixed in such angulation (by means not shown).

The four cornermost mirrors of the assembly are also actuated by link and bell crank mechanism on vertical axes (lines extending upwardly through the center points of said corner mirrors) as will now be described. Adjustment movement is provided again by the oscillation of elongate top rock shaft 32 through right and left endmost rocker arms 40a and 40b (see FIG. 3). Short depending links 41a and 41b are pivoted at their upper ends to rocker arms 40a and 40b and at their lower ends are pivotally connected by pins 42a and 42b with the upper rearwardly projecting ends of bell crank levers 43a and 43b, respectively. The fulcrums of said last-mentioned bell cranks are pivoted to suitable blocks b affixed to the left and right hand vertical support bars 28. The depending and working ends of the bell cranks 43a and 43b are pivoted to forwardly extending short bars 44a and 44b, respectively, which at their forward ends have ball and socket connections near the vertical outer edges of the corner mirrors of the upper horizontal bank. So connected, tilting adjustment of the two upper corner mirrors on vertical axes will be in opposite directions.

The corner mirrors of the lower horizontal bank are similarly actuated and tilted on vertical mid-axes. To such ends, elongate upstanding links 45a and 45b are pivotally connected at their upper ends with the rearwardly projecting arms of the bell cranks 43a and 43b and their lower ends are pivotally connected by pins 46a and 46b with the rearwardly extending lower arms of bell cranks 47a and 47b, respectively. Said last-mentioned bell cranks are fulcrumed on blocks b affixed to the left and right rigid side members of the mounted frame F. The working ends of said bell cranks 47a and 47b are pivotally connected to short blocks 48a and 48b which at their outer ends have ball and socket connections with the outside vertical edges of the corner mirrors of the lower horizontal bank.

Figures 9, 10:
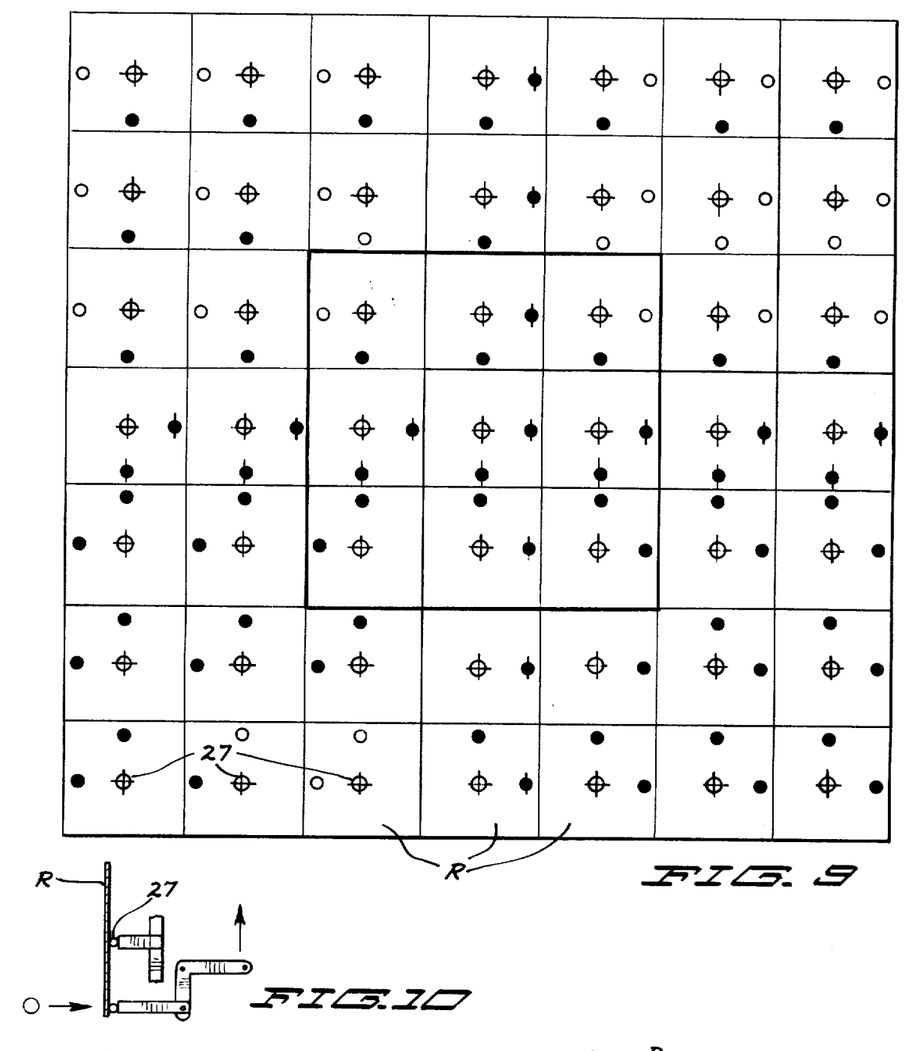
FIG. 9 is a diagrammatical rear elevation of a preferred multi-reflector unit showing the universal support connections for the individual mirrors, the pressure-applying points and the pull applying points for the adjustment mechanism.
FIGS. 10, 11 and 12 show detail types or bell cranks and abutment means with corresponding symbols used on FIG. 9 for mirror adjustment.
Figure 11:
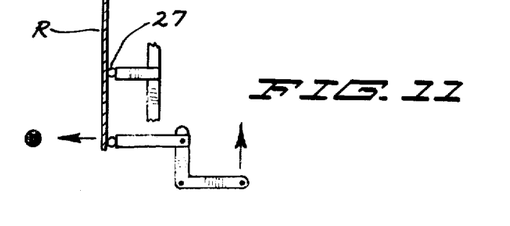
Figure 12:
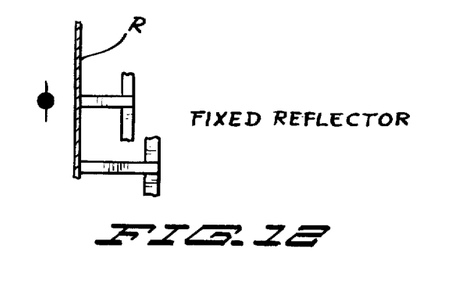

In FIG. 9 a diagrammatic elevational view is shown of a high capacity multi-mirror unit comprising 49 individual mirrors. Such high capacity unit is preferred in commercial forms of the invention for use in electric power plants for towns, cities and the like. Symbols are employed in FIG. 9 for indicating the centermost ball and socket support joint for each individual mirror; the connection by short bars with the working ends of two types of bell crank levers and such symbols in FIGS. 10 to 12 inclusive are related to diagrammatic views of the respective connection. It is to be understood that preferably the connection of each short bar at the working ends of the respective bell cranks provides a universal or ball and socket joint. Thus, while as previously explained, some of those connections are with vertical or horizontal edges of a mirror to restrict and prevent tilting on one axis, they will permit tilting on an axis perpendicular thereto unless a second fixed connector is employed. The nine central mirrors, border outline of which is heavily shown, represent the nine mirrors illustrated in the first embodiment of the invention. By inspecting the symbols employed in the respective mirrors of FIG. 9 and understanding the significance of the connections, the multiple tilting adjustments and single tilting adjustments of the individual mirrors can be determined. It should be significant that even with the large multiplicity of mirrors used in the diagram of FIG. 9, all progressive adjustments can be obtained through simple vertical link connections with the essential bell cranks. All of such adjustments are progressively controlled by powered oscillation of the top transverse rock shaft 32 which actuates by the rock bars, the several linkage and bell crank connections. It will, of course, be understood that various equivalent, mechanical or electrical operating means may be substituted for the embodiment disclosed all within the scope of applicant's invention.

It will be noted (see FIG. 2) that where two or more multiple reflector units are employed, the horizontal axes of the two oscillatory frames F instead of being precisely perpendicular to radii of the boiler B extend at oblique angles slightly of about 15° to 20° therefrom. This provides for proper calibration of the tilted positions of the multiple of mirrors in the two units to provide for efficient reflection of solar rays on the exposure of the boiler without crossing of such reflected rays from the two units.

As a means to restrict the vertical central bank of mirrors from tilting on upstanding or vertical axes, I provide as shown (see FIG. 3) a rigid, upstanding bar 50 affixed to the general frame F of the unit having spaced blocks 51, 52 and 53 disposed on the horizontal axes of the central vertical bank of mirrors, and which blocks have at their outer ends ball and socket connection with the left hand edges (see FIG. 3) of said three mirrors.

It is of course to be understood that in the original calibration and setting of the apparatus the mirrors to the left and right of the central vertical bank will have predetermined angular adjustments tilted on mid-line vertical axes. The corner mirrors of the nine illustrated will have predetermined angular relations also tilted on horizontal axes as previously described. After the fixed angular relations, the entire progressive adjustments for varying elevation of the sun as well as for variance in the horizontal component of the sun's trajectory, are controlled by the described linkage and levers entirely by the overall tilting of rectangular frame F. Such tilting and the reverse tilting is progressively and efficiently controlled by suitable mechanism and means to be described.

The said controls provide for, as shown, motor-driven reversible tilting of the frame by electric motor and transmission mechanism mounted on one of the heavy, upstanding support posts and control of the circuitry and reversibility of the motor by a conventional heliostat or sun sensor.

BOILER OR VAPORIZER STRUCTURE

Figure 7:
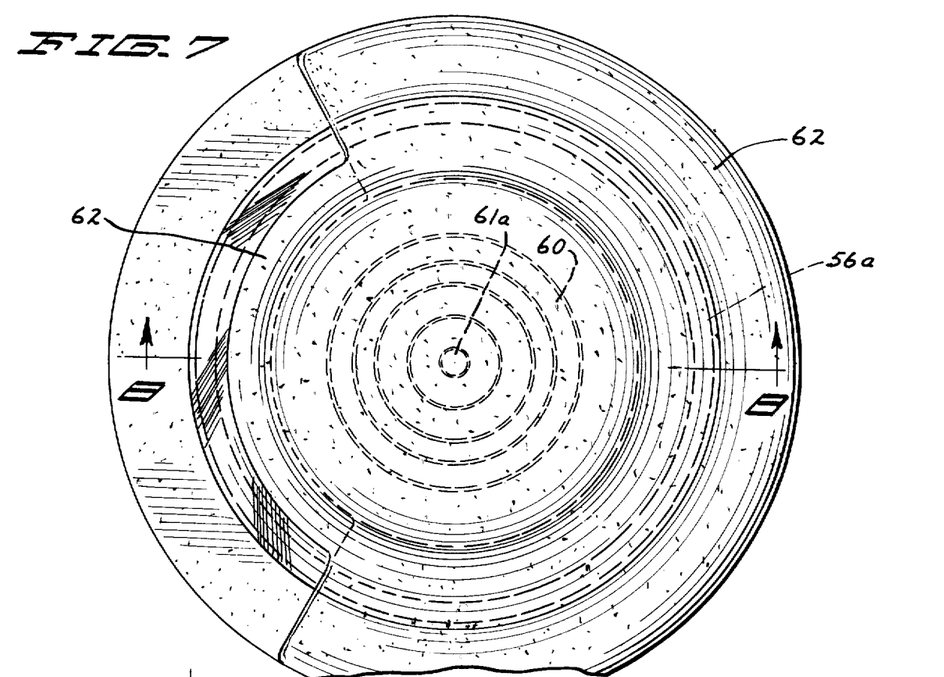
FIG. 7 is a plan view of the boiler or vaporizer of my invention.

Referring now in some detail to the heat-absorbing boiler or vaporizer indicated as an entirety previously as letter B, the base and lower portion of the boiler body, indicated as 55a, comprises a cylindrical shell continuing in an upper truncated conical portion 55b and a domed heat 55c (see FIGS. 6 and 7). The entire outer body structure is preferably constructed of a metal or metal alloy such as copper having very high heat conductivity. This entire shell, indicated as 55, is disposed in spaced relation to an inner metal shell of similar contour and shape, 56, forming in its spaced relation a rather narrow annular chamber closed at its lower edge and communicating at its upper edge with the interior of a circular vapor chamber 57 (see FIG. 8). The lower portion of the overall boiler body, as shown in FIG. 2, extends below the level of the turntable TT, the upper portion including most of the truncated conical configuration 55b and the upper dome 55c projects some distance above the turntable to expose unshielded segmental portion of the truncated area which is designated as the exposure portion of the boiler B-1.

The entire boiler structure per se is stationary and axially disposed of the turntable TT within the confines within the hub-like annulus 25 of the turntable.

Figure 8:
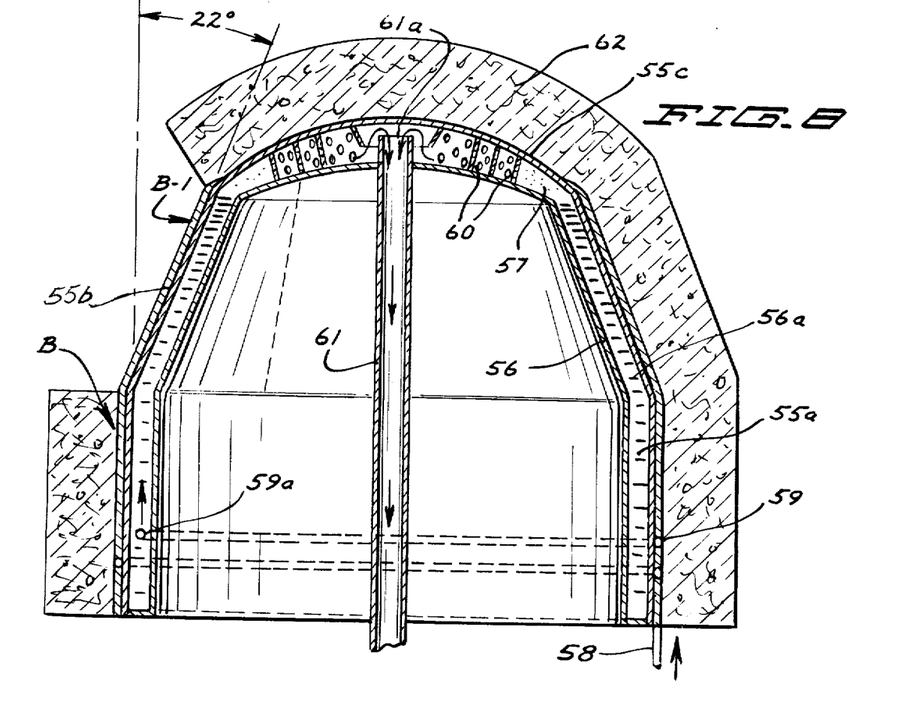
FIG. 8 is a vertical section along the line 8—8 of FIG. 7.

Mercury in liquid form is flowed by pump or liquid head to an inlet 58 in the direction shown by the arrow FIG. 8 through a helical coil 59 surrounding the exterior of the lower portion 55a of the boiler body, and communicating at its upper end through a passage 59a with the annular chamber 56a of the boiler body. This annular chamber is very effectively heated by the reflective solar rays striking the exposure portion B-1 thereof, and the mercury in said chamber is mostly in vapor form, arising to the dome circular chamber 57 in the top portion of the body. The vapor, containing sometimes liquid and in some instances small globular particles, is further heated in the highest temperature dome of the boiler and passes through a series of apertured striker plates 60 transversely disposed of the dome chamber 57 which have the effect of skimming liquid and which are intensely heated to vaporize any few globules of mercury not yet vaporised. The vapor from the dome circular chamber 57 passes downwardly axially of the boiler at the hottest point of the dome therein through the inlet 61a of a vertical and axial vapor tube 61 from the lower end of which it is distributed and transferred to a collector, storage medium or other medium connected with and constituting a part of the overall energy system.

Closely cooperating with the dome and body of vaporizer B is a thick insulating shroud or cover 62, as shown rigidly secured at its base to the central hub-like portion 25 of the turntable. The material of the insulating shroud 62 has exceedingly high heatinsulating properties and at its top interior, indicated as 62a, is in light contact with the top of the dome portion 45c of the boiler body. The other portions internally of shroud 62 are spaced a slight distance outwardly of the exterior of the boiler body and a segmental generally rectangular portion of the shroud 62, as shown in FIGS. 2 and 8, is cut to form an exposure opening, indicated as an entirety as B-1. Shroud 62 is affixed to the hub portion of turntable TT and is revolved therewith.

The height of the boiler B and particularly the height of the exposure area B-1 is such, that taking into consideration radial distance from the exposure area B-1 to the centermost fixed mirror of a unit, reflected solar rays at sunrise will strike the center of exposure area of the boiler, and consequently the calibrated, predetermined starting position of all of the mirrors of the unit will reflect solar rays to said exposure area.

The walls of boiler B may be constructed of conductive metal such as stainless steel or copper. The exterior of the shell portion 55 is densely covered with non-reflective, heat-absorbent material such as an efficient "black".

CONTROLLED OSCILLATION OF MIRROR-UNIT FRAME

Figures 3, 4:
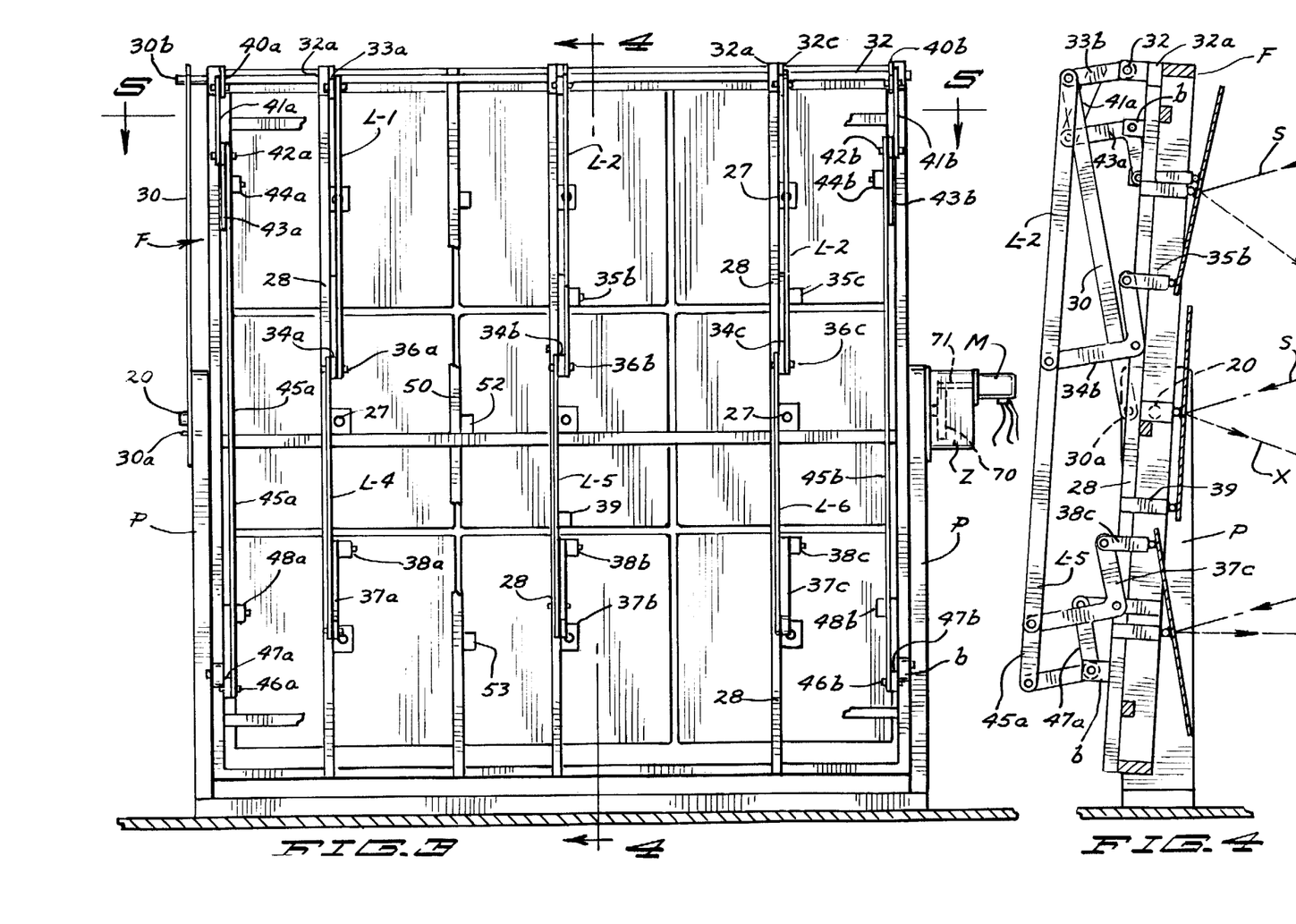
FIG. 3 is a rear elevation on a larger scale showing a part of the individual mirror-adjusting mechanism for one of the multi-mirror reflecting units.
FIG. 4 is a vertical section taken on the section line 4—4 of FIG. 3.
Figure 5:
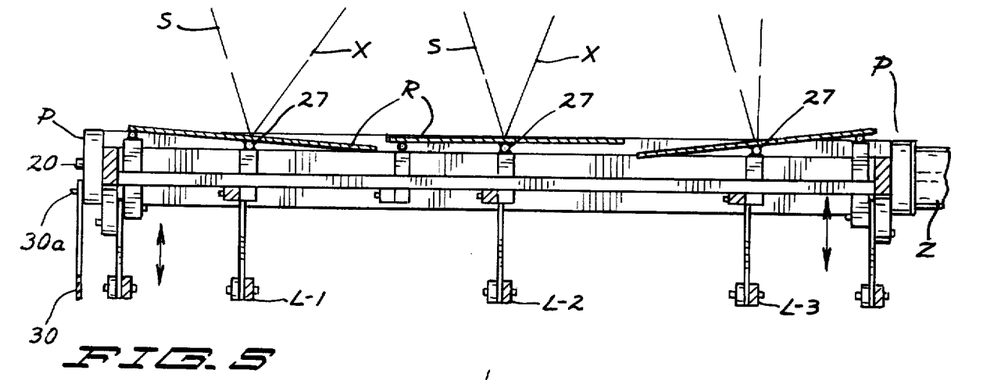
FIG. 5 is a horizontal section taken on the line 5—5 of FIG. 3.

While it will be understood that numerous means and mechanism may be successfully utilized for progressively tilting the rigid mounting frame F of each multi-mirror unit, the means and mechanism illustrated somewhat diagrammatically in FIG. 3 comprises the following: The heavy righthand trunnion 20 journalled on the horizontal mid-center line is provided with a fixed worm gear 70 which is meshed with a relatively very small worm 71 affixed to the power takeoff shaft of a reduction gear mesh mechanism. Said mechanism with an electrical motor M. is housed within a case 73 rigidly affixed to the upper portion of the righthand supporting post P (in FIG. 3). The motor is a reversible motor designed for almost instant starting and stopping and the circuitry from said motor is controlled from a remote control box, circuits of which are responsive to a sun sensor.

Generally speaking, when frame F is positioned, as shown in FIG. 4, swung inwardly from vertical position at about an 8° to 10° angle the individual mirrors are automatically positioned to receive the sun's rays in approximately sunrising position with the solar rays extending at an acute angle of about 15° to the horizon. The mirror units, turntable mounted, will then, by mechanism hereinafter to be described, be related on the turntable track for effectively tracking the sun. As the sun rises to its highest elevation on the particular day, the unit frame F will be progressively oscillated under circuitry control of the motor to a maximum tilted position approximately as shown in FIG. 6 of from 42° to 50° tilting backward from the vertical (depending of course on the season and the particular day of operation). Thereafter, as the path of the sun declines, operation of motor M will be reversed by control to progressively return by oscillation the frame to approximately the original starting position at the setting of the sun.

DRIVING AND CONTROL OF MOUNTING PLATFORM

Figure 14:
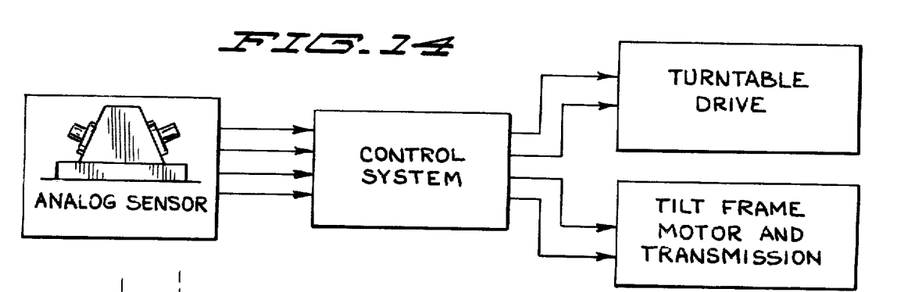

While sophisticated, sun sensor control means may be provided, as schematically illustrated in FIG. 14, to progressively apply driving power to the turntable TT, I prefer to utilize for simple driving and control thereof (as schematically shown in FIG. 1) the following mechanism and controls:

One or more identical reversible motors M-2 mechanically drive connected with predetermined, reduction gear transmission mechanism are mounted in suitable heavy housings H rigidly affixed to the outer rigid annulus 21 of the turntable TT. The output shaft of such mechanical transmission carries a heavy friction drive roller D which frictionally engages the external side of track 23. Speed adjustment of the transmission mechanism or other satisfactory control of the driving speed and ratio of the turntable is provided so that if no reversing of the electrical motors is interposed the turntable would make a complete revolution throughout a 24 hour time cycle.

However, since in substantially all latitudes of the earth the sun's rays for different days of the year are only available for varying and predetermined hours and minutes, the varying rotative travel and starting point of the turntable with the multi-reflector unit or units mounted thereon are for each day during the year pushbutton controlled.

To such ends calibrated graduations and indicia may be supported or suspended below the stationary track 23 showing starting points of the apparatus for the necessary change day-by-day or multiweekly times for the apparatus.

Apparatus of the complexity required in simple form normally should require supervision of a trained employee. This employee, each day after sundown or before sunrise, by push-button would reverse the driving motor or motors for the turntable and, if desired, simultaneously shift gears in the transmission to substantially accelerate reverse or counterclockwise revolution of the turntable. When the turntable returns to the starting position shown for the next calendar day or the next starting position, the operator would de-energize the motor circuitry and the apparatus would be in starting position for the rising of the sun the next day. A time-controlled switch may be used to control the normal driving of the motors at sunrise of the next day.

It will be understood that an external stationary bull gear may be affixed to the lower portion of the circular rail or track 23 and a positive pinion drive D substituted for the friction driving element, or that any equivalent and more efficient predetermined speed driving means may be employed controlled in operation by a time control switch or other means for opening the motor circuit.

It will also be understood that the respective weights of the two reflector units and their mounting frames and actuators will be counterbalanced in the opposing circumferential structure of turntable TT partially by the driving motor or motors M-2 and partially by the addition of the heavy material or counterweights to perfectly balance the turntable and facilitate somewhat revolution thereof on the supporting track 23.

The driving and control of the turntable TT, where sun tracking mechanism dictates control, will be described later herein.

CONTROL SYSTEMS RESPONSIVE TO SUN SENSOR OR HELIOSTAT

Figure 13:
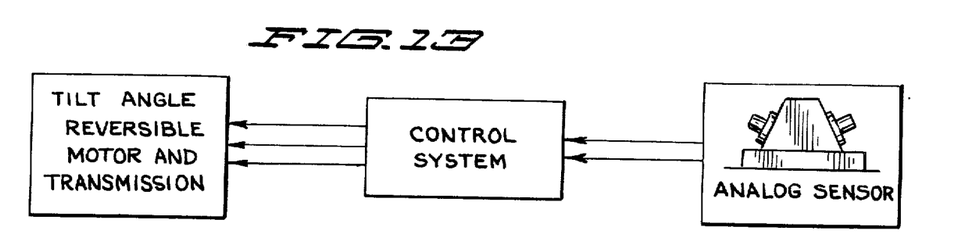
FIGS. 13 and 14 are schematic diagrams indicating control for driving means responsive to an analog sensor.

Referring first to the schematic illustration of FIG. 13, a suitable conventional sun sensor, entitled in the block "analog sensor", is employed, which preferably is of the type affording sun angle sensing. Such a sensor, for example, may be commercially purchased from Adcole Corporation of Waltham, Massachusetts, and the type of sensor known as a heliostat having an analog output is satisfactory for use with the system schematically shown in FIG. 13, as well as FIG. 14. In FIG. 13 the output of the analog sensor connects with electrical circuitry constituting a part of the system contained in the "control" block of the drawings which by relay, solenoid or otherwise will actuate switching mechanism to the reversible motor for actuating the elevational tilting of the rectangular frame F of a multiple mirror unit. FIG. 13 schematically illustrates the simplest use of a sun sensor to sense sun angle or elevation and where this system of FIG. 13 is utilized the simplest means of predetermining by operator control the starting position of the sun track of the turntable TT is employed, as described in pages 19–20 thereof.

Referring to the schematic showing of FIG. 14, the sun sensor here and its output is responsible for operating two control system phases. The function of controlling circuitry for the elevational tilting of the large rectangular multi-mirror frame is similar to the circuitry and control shown in FIG. 13.

In addition, however, the sensing of the sun during its variable trajectory from sunrise to sunset in a generally horizontal direction is detected by the analog sensor and is responsive to circuitry for controlling off and on of the turntable driving means.

Since heliostats with cooperating circuitry and drive means are well known in the art as maufactured and sold by Adcole Corporation of Waltham, Massachusetts, and by Carson Astronomical Instruments, Inc. of Valencia, California, the foregoing description and schematic views are deemed adequate.

PREFERRED HEAT-STORING MEDIUM

For continuously or intermittently receiving transfer of heat and storing the same, I prefer to employ a receiving and storing medium consisting in a dense filling or admixture of copper particles and ordinary salt granules (NaCl). These ingredients are intimately admixed and substantially fill a large casing or housing constructed of highly efficient heat-insulating material such as, for example, a wall thickness of 12 inches of asbestos or vermiculate. Particle size of the salt and copper ingredients preferably would run from 100 to 300 microns in largest dimensions. A heat-transferring coil or the equivalent of a highly conductive metal, such as stainless steel or copper, is submerged in the said filler material and its intake end is connected with the output of the very high temperature mercury vapor or other fluid discharged through the axial tube of the boiler B shown in FIG. 8. One or more additional coils, boilers or other heat-transfer means may also be embedded in the said storage medium and connected at their intake ends with vapor or liquid lines for generating steam or hot fluids by passage through the storage unit. The flow of fluid through such lines may, of course, be controlled for use as needed for the supply of steam for turbines which in turn may drive electrical generators.

My experimentation with the said particulate copper and salt for heat-storage material has shown that a preferential range of proportions by volume of from 20% to 40% copper with the balance NaCl.

With my system as described, and efficiently insulated conduits from the boiler to the heat-storing medium, transfer of heat should produce temperatures slightly in excess of 1400° of residual heat stored in the material. I have discovered that ordinary salt has unexpectedly high heat-retention abilities and mixed with the highly conductive copper particles is productive of an economical heat-retention and storage unit.

A SECOND EMBODIMENT OF THE INVENTION

Figure 15:
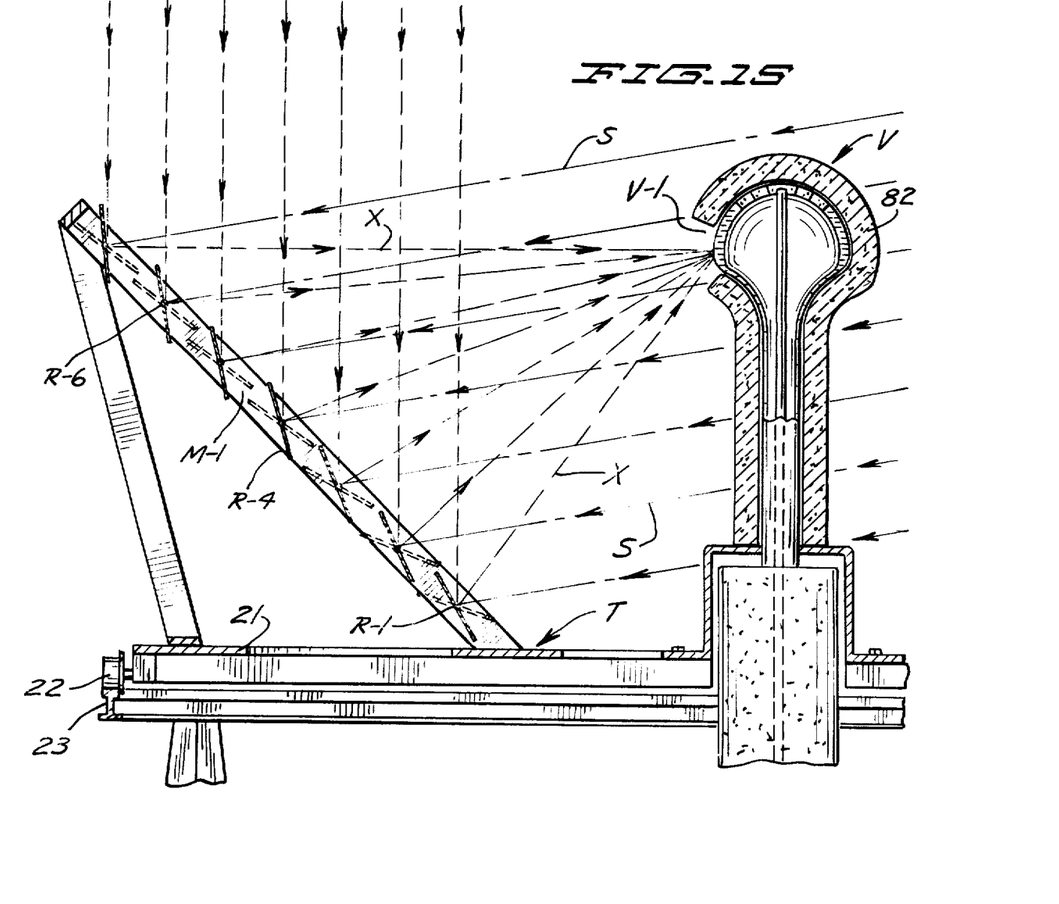
FIGS. 15 and 16 constitute a vertical section and a top plan view of a second embodiment of the invention.
Figures 16, 17:
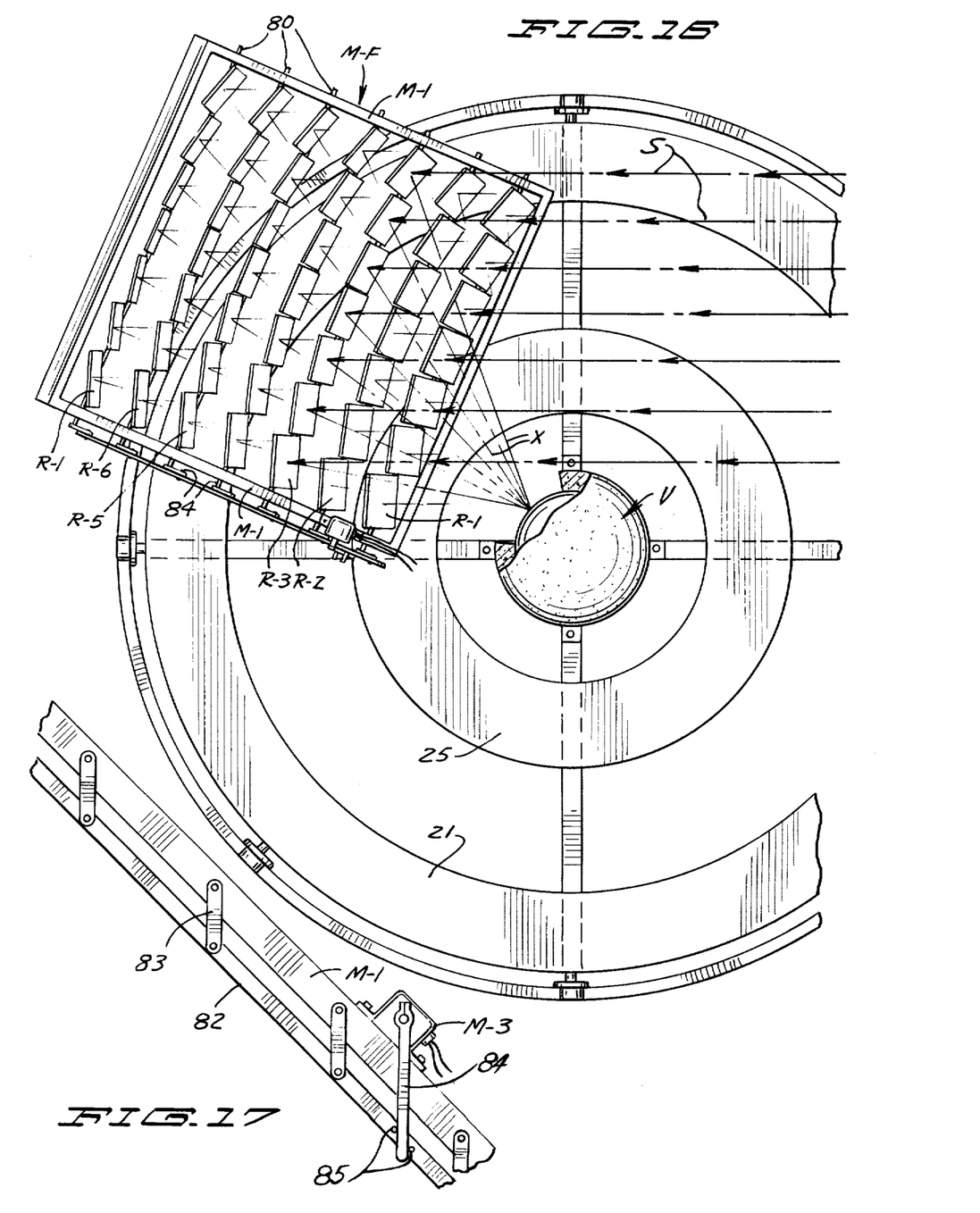
FIG. 17 is a detail elevation of a reversible drive for controlling oscillation of the several axles on which banks of mirrors are mounted.

In FIGS. 15 and 16 of the patent drawings, a second and somewhat simplified embodiment of the invention is illustrated wherein the multiplicity of preferably flat reflectors are mounted in horizontally extending contiguous banks and on successive horizontal tilt axes. Instead of mounting and supporting the said banks of mirrors upon an elevationally tiltable frame, their successive axes from bottommost bank to uppermost are arranged in parallel "stadium" relation to the central part of the turntable, and in operation no tilting variation of any mirrors on upstanding (vertical) axes is needed to properly focus all of the mirrors during tracking of the sun through its daily trajectory. A central upstanding and axial vaporizer V is employed having an exposure area V-1 which has its center disposed in height slightly (within a range of 2° to 6°) below the horizontal centers of the uppermost bank of tiltable mirrors.

While only one multi-reflector unit is shown in the drawings, it will be understood that two or more units working in close cooperation may be employed. The turntable, designated as an entirety by T, is mounted similarly to the turntable of the first embodiment and is supported on heavy tracks 23 by a plurality of flanged wheels 22 which are journalled in bolsters 22a depending from and rigidly attached at circumferentially spaced points to the outer concentric annulus 21 of the turntable.

A rugged and rigid rectangular mounting frame, indicated as an entirety by MF, is rigidly supported and affixed circumferentially in an inclined relation to the general horizontal surface of turntable T and extends planarwise at an angle approximating 45° (range between 40° and 50°) to the top turntable surface. The successive elongate axles 80 for the several horizontal rows or banks of reflector mirrors are suitably journalled in bearings provided by the rigid inclined end members M-1 of the mounting frame with the result that the several axles 80 of the successive banks are in parallel relationship at differential distances from the exposure area V-1 of the vaporizer V. As shown, several horizontal banks of mirrors (seven) are employed, being respectively numbered from the lowermost to the outer and uppermost as R-1 through R-7. As shown, seven planar mirrors are employed in each horizontal bank.

A simple axle means, in the form of a rigid shaft 80, is employed for mounting the seven mirrors of each bank with the ends of said shaft being journalled in suitable bearings provided in the inclined side members M-1 of the mounting frame. The several mirrors of each bank are rigidly affixed by suitable means to the respective axle shaft 80. In this connection the surface of the centermost mirror is parallel to the axis and each successive mirror of the bank at both sides of the central mirror is predeterminately angled as shown and diagrammatically indicated in FIG. 16. The successive angulations to the plane of the central mirror on the specific embodiment disclosed in FIGS. 15 and 16 is indicated in degrees on the cross sectional areas diagrammatically shown in FIG. 16. In considering the said angulations expressed, it should be noted that the longitudinal center line of mounting of the entire unit does not extend at 90° to a radius from the vaporizer V but is purposely disposed somewhat obliquely to said radius. The leading end of the reflector unit during revolution of the turntable T extends outwardly some distance further than the trailing end as in the embodiment first described.

In FIG. 15 the full line cross sectional representations of the mirrors are in the positions of start of operation at sunrise while the dotted line cross sectional elements indicate angular tilting of the mirrors by oscillation of the axles 80 at the highest elevation of the sun's trajectory for a predetermined day or period.

The relationship of predetermined angulation of the seven mirrors of the other horizontal banks is similar to the positions and angulations shown in cross section in FIG. 16, but of course it will be understood that the banks of mirrors extending successively upward from the central mirror will be predeterminately tilted on horizontal axes relative to the mirrors of the central horizontal bank as shown in FIG. 15 in cross section. It will be understood that in the original calibration and setting of the apparatus, the mirrors to the left and right of the central vertical bank will have predetermined angular adjustments tilted on midline upstanding or vertical axes. The individual mirrors of each bank are fixed at predetermined tilted angulation to their respective axes, and when the apparatus is set up variable oscillation of the respective axle shafts 80 is predetermined to cause all mirrors to focus on the exposure area V-1 of the vaporizer at the start of the cycle of operation at sunrise. Various means of interconnection of the seven spaced axles 80 may be employed and for simplicity I have shown the axles in the form of oscillatory rock shafts with corresponding left ends thereof having properly affixed thereto a rocker arm 83. The rocker arms are respectively affixed to shafts 80 for variable angulation in perfectly focusing the mirrors during all parts of the cycle of operation and, as shown, are actuated by longitudinal reciprocation of an actuating bar 82 which is disposed in substantially parallel relation with one of the frame ends M-1, as shown in FIG. 17. The lower ends of each of the rocker arms 83 has pivotal connection with actuating bar 82 and this bar may be longitudinally reciprocated by a rigid arm 84 affixed to power takeoff shaft of the transmission mechanism driven by a reversible motor M-3. The outer and free end of actuator arm 84 works between a pair of pins 85 affixed to the lower portion of the bar 82.

SUMMARY

From the foregoing description and drawings it will be apparent that my discoveries will produce a maximum direct reflection and concentration of solar rays upon the heat-absorption or exposure area in relation to the cumulative reflective area employed. Such new and improved results are obtained through the combination of components or factors which include the orbital travel of one or more multi-reflector units having individual reflective surfaces which are varied angularly or tiltwise in cycle of operation through suitable operating connections actuated in response to conventional sun sensors. The cooperative functioning of the multi-reflector units or unit with the axially disposed heat-absorbent portion of the boiler and the relative heights thereof cooperate in combinative manner to produce the said maximum concentration and direct reflection. With two or more multi-reflector units disposed generally end-to-end in the somewhat oblique positions to radii, the height of the units as contrasted with anything in prior art is substantially lessened.

The new functioning and operation of my system or apparatus can be said to split the angle of solar rays (to horizontal), and direct reflection with maximum concentration is obtained without additional or intervening parabolic or other reflective devices interposed in the overall reflective cycles. Thus in the highest seasonal elevation of the sun in the zenith the downward vertical rays will be split and reflected with the majority of the mirrors tilted on horizontal axes disposed and arranged between 38° to 50° angulation to the horizontal.

While I prefer to utilize from my individual reflectors planar rectangular surface reflectors, it will be understood that my invention is in no way limited to the same and that dished or somewhat parabolic or segmental cylindrical reflectors may be employed with, of course, the necessary affixation and calibration required to focus solar rays directly upon the heat-absorption medium or area.

It will also be understood that the interconnection of individual reflectors in each unit or interconnection of oscillatory axis in the second embodiment of my invention may be conventionally varied with equivalent linkage and interconnection to operate and be actuated in the general system disclosed.

It is to be understood that the terms "variable tilting", "angularly tilted" or "tiltable" utilized in the claims shall be construed broadly to include tilting of the individual reflectors both on axes extending upwardly through the midlines or on axes extending on horizontal midlines, as well as to tilting of the mirror or mirrors on either of said axes per se.

What is claimed is:

1. In a system for collecting and transferring solar heat energy which employs a reflector unit-supporting device moved in orbital travel through a curvilinear path:
  a multi-reflector unit comprising a multiplicity of individual reflector elements predeterminately arranged in a group area,
  an upstanding mounting frame wherein said multiplicity of reflector elements are supported for variable angular tilting functions during cyclical operation of said system,
  means for mounting said frame on said unit-supporting device with freedom for tilting oscillation on a horizontal axis disposed centrally of said reflector group area,
  reversible driving means controlled by a sun sensor for tilting said frame in synchronism with elevational variance of the sun in a daily cycle,
  a solar ray absorbing generator having an exposure area disposed axially of the orbit of said supporting device,
  the reflector elements of said group area being arranged and mounted in a series of generally horizontally extending rows and in a series of transversely extending rows, each of said series having a centrally disposed row,
  means for mounting said individual reflectors for freedom of oscillatory tilting on horizontal axes and also on axes extending perpendicularly to said horizontal axes, and
  actuator driving means connected between said tilting frame and all of said individual reflector elements, with the exception of those elements extending in said central rows, for variably tilting and oscillating said non-excepted reflector elements on both horizontal and transverse axes to cause all of said non-excepted reflectors during cyclical operation of said system in response to tilting movements of said frame to constantly focus upon said exposure area of the generator.

2. The system and combination set forth in claim 1 wherein said actuator driving means includes a substantially horizontal rock shaft oscillated by movement of said tilting mounting frame, and rocker arm linkage between said rock shaft and said individual reflectors.

3. The structure and combination set forth in claim 1 wherein said horizontally extending rows of reflectors are successively disposed one above the other and above said unit supporting device and wherein the positional relationship of the exposure surface of said generator and the focus center line of said reflector unit, when the upper periphery of said unit is in uppermost position, extends substantially axially through the center of said exposure area.

4. The system and combination set forth in claim 1 wherein,
  a fluid conduit medium is mounted within and constitutes a part of said generator and includes a discharge connectible with a heat-storage or heatutilizing system.

5. The system and combination set forth in claim 1, and additional driving means between said tilting frame and the individual reflector elements of said central transversely arranged row of elements for variably tilting said elements only on axes disposed transversely of the horizontal to cause such reflectors, responsive to tilting of said frame, to constantly focus upon exposure area of the generator during cyclical operation of said system.

6. The system and combination set forth in claim 1, wherein no tilting driving means are supplied for the central row of reflector elements extending horizontally but wherein said elements are successively permanently set on different angulations relative to the general plane defined by said frame to constantly focus upon the exposure area of the generator due entirely to the elevational tilting of said frame in cyclical operation of said system.

7. The system and combination set forth in claim 1, wherein the elevational tilting of said frame and the mirrors contained therein respond to approximately one-half of the elevational variance of the sun during the day between sunrise and sunset and wherein the variable tilting of the individual reflector elements with the exception of those elements extending in said central row through said actuator driving connections respond to the other half of the variation in elevation of the sun during the day.

8. The system and combination set forth in claim 1, wherein said solar ray-absorbing generator is stationary and is disposed at a level above the lowermost marginal area of said frame in all swinging movements thereof and below the uppermost positioning of said frame in all swinging movements thereof.

9. The system and combination of preceding claim 8 wherein said generator has a generally partial spherical surface at the upper portion thereof,
- a shroud and shielding member constructed of heat-insulating material covering most of said exposure area of said heat generator and having an exposure window area through which reflected solar rays may pass, and
- means interconnecting said shielding member with said reflector supporting device for causing said shielding member to revolve about said generator during orbital travel of said supporting device.

10. A system for collecting and using solar energy having in combination:
- a reflector-supporting device powered for orbital travel through a substantially circular path defining generally a horizontal plane,
- a reflector unit mounted on said supporting device for swinging oscillation on a substantially horizontal axis, upwardly and downwardly,
- controlled means for propelling said supporting device through said orbital path,
- a stationary solar heat generator having an upstanding stationary external exposure surface disposed axially of the travel orbit of said supporting device and having a symmetrical shape which is circular in horizontal cross section,
- a shroud and shielding member of shell shape complemental to said exposure surface constructed of heat-insulating material and movably overlying and covering said exposure area of said heat generator and having an exposure window area through which reflected solar rays may pass, and
- means interconnecting said shielding member with said reflector supporting device for causing said shielding member to revolve about said generator during orbital travel of said supporting device.

11. The structure and combination set forth in claim 10 wherein said external exposure surface of said generator is substantially spherical and wherein said shroud and shielding member is substantially semispherical.

* * * * *